March 11, 1941.  C. E. COX  2,234,427
FILM SLIDE HOLDER
Filed Feb. 9, 1939
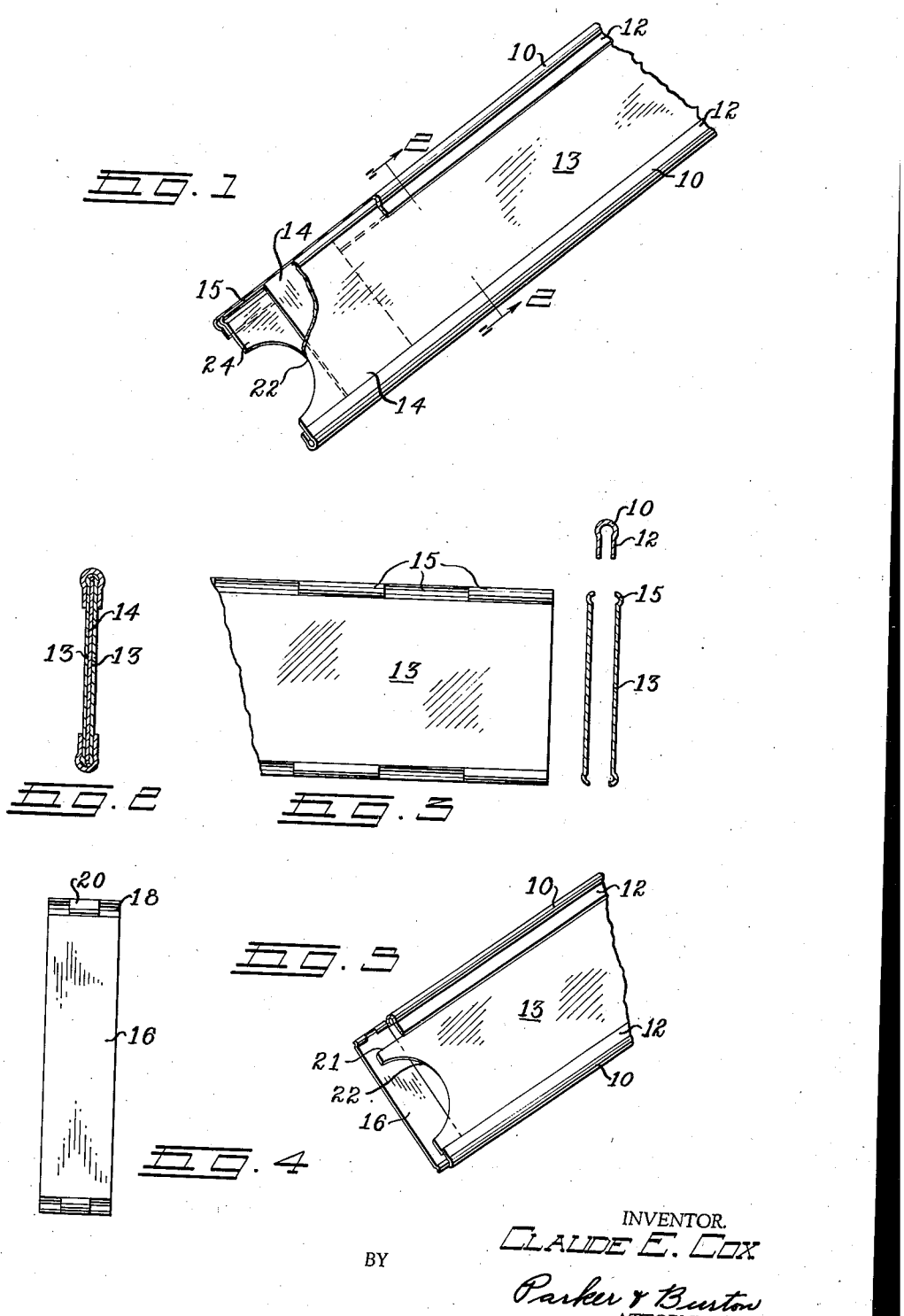
INVENTOR.
CLAUDE E. COX
BY
Parker & Burton
ATTORNEYS.

Patented Mar. 11, 1941

2,234,427

UNITED STATES PATENT OFFICE 2,234,427

FILM SLIDE HOLDER

Claude E. Cox, Detroit, Mich.

Application February 9, 1939, Serial No. 255,394

5 Claims. (Cl. 88—26)

This invention relates to an improved film slide or holder adapted to maintain a plurality of films arranged in line therein for viewing or for projection upon a screen. The construction is such that films may be quickly and easily inserted in the slide or removed from it.

Another object is to provide such a slide which is inexpensive, which is of light weight and which is of relatively small size whereby a large number of such slides may be stored within a small space.

The films carried by the slide are not only capable of being viewed or projected as desired but are protected by the slide from breakage or rupture and from bending or warping.

Other objects, advantages and meritorious characteristics of this improved film slide or holder will become evident from the following specification, appended claims and accompanying drawing, wherein:

Figure 1 is a broken away perspective of my improved slide,

Fig. 2 is a cross-sectional view taken on line 2—2 of Fig. 1,

Fig. 3 is a view of my improved slide showing the parts separated from each other, Fig. 4 is an elevation of an end spacer member which forms a part of the slide, and Fig. 5 is a fragmentary perspective of the modified form of a slide embodying the end spacer of Fig. 4.

Two modifications of my improved slide are illustrated in the drawing. The first modification is shown in the first three figures of the drawing. The second modification is shown in Figs. 4 and 5 of the drawing. The slides illustrated in these first three figures are adapted, as is the slide shown in Fig. 5, to support a plurality of films in alignment so that they may be positioned in a projection machine for viewing upon a screen or they may be viewed directly in the slide.

The slide is so constructed that the films may be readily inserted therein or removed therefrom. The slide itself comprises a pair of opposed complementary channeled frame elements. Each frame element is so shaped as to have a marginal portion in the form of a bead or a tube 10 as illustrated particularly in the cross sectional views and opposed side walls 12. To protect and support the films there are two complementary transparent plates 13. These may be formed of mica, Celluloid, or any suitable transparent material such as some of the modern transparent plastics. These plates are of a length to embrace whatever number of films are desired to be carried within one frame.

A single film is shown in dotted and solid line at 14 in Fig. 1. A plurality of these films can be arranged in alignment between the transparencies 13.

In Figs. 1, 2 and 3 the transparent plates 13 are shaped at their margins as shown at 15 so that when arranged upon opposite sides of a film these marginal portions 15 will jointly form a substantially tubular portion that will be received snugly within the tubular margin 10 of the frame element. These embossments, enlarged marginal portions or protrusions 15 are of a size to be snugly receivable within the tubular head 10 of the frame elements as shown in Figs. 1 and 2.

These protruding complementary marginal portions 15 of the plates may be tubular embossments which extend the full length of the plate as shown in Fig. 1 reinforcing and strengthening the same throughout its length or such embossments may be formed at the ends of the plates only or at spaced intervals therealong as shown in Fig. 3. The frame elements are formed of metal or the like and are resilient so that their side walls 12 grip the transparent plates 13 together therebetween holding the films 14 firmly between the transparent plates. These plates, upon seating of their enlarged margins 15 within the tubular margins 10 of the frame elements hold said frame elements in spaced apart relationship and are in turn held by the frame elements against displacement.

Due to the construction of the slide in the manner described it will be seen that a large number of these slides containing films may be stored in a very small space and that the slide is of such a character that it will effectively protect the film while permitting the desired viewing thereof.

In the modified construction shown in Figs. 4 and 5 of the drawing there are provided end spacer members 16 to hold the channel frame elements in spaced apart relationship. One end spacer member is shown enlarged in Fig. 4. Its marginal end portions are bent in opposite direction as at 18 and 20 so that the two parts 18 and the single part 20 jointly form a tubular marginal portion. This member 16 may be formed of sheet metal so that the parts 18 and 20 possess resiliency whereby they may be resistingly inserted into the tubular margin 10 of the frame elements as shown in Fig. 5 with the end spacer disposed between the plates 13. An end spacer 16 is provided for each end of the slide.

Each transparent plate 13 is notched at its corners as at 21 as shown in Fig. 5 and provided with a thumb grip aperture 22 as there shown. The tubular end portions 18 and 20 of an end spacer 16 will be disposed within the notched corners 21 of the transparent plates 13 to seat directly within the channel frame member. The spacer plate 16 will bridge the thumb grip aperture 22 of the transparent plates so as to be exposed to be gripped to permit disassembly of the slide.

The transparent plates have a width substantially equal to the width of the films held thereby and the films are of substantially equal width so that when the films are disposed between the plates and the plates inserted within the channel frames the plates and films will seat within the base of the channel frames as illustrated in Figs. 1 and 2 where the film 14 is shown as disposed between the plates 13 and seated as described. Seated in this manner the films will not have any permitted play.

What I claim is:

1. A film slide comprising, in combination, a pair of opposed complementary channel frame elements each having its side walls held resiliently toward each other, means engaged within said frame elements holding them in spaced apart relationship including a pair of transparent plates of substantially equal width disposed on opposite sides of a plurality of aligned films of substantially equal width, said plates having their marginal portions received and seated within the channel frame elements, said transparent plates held yieldingly together by the side walls of the frame elements.

2. A film slide comprising, in combination, a pair of opposed complementary channel frame elements each having a channel base which is resilient and substantially tubular in cross section and provided with side walls held resiliently toward each other, a pair of transparent plates having enlarged marginal portions shaped to be snugly received within the tubular channel base of each frame element holding said frame elements in spaced apart relationship and with the side walls of each frame element resiliently holding said plates together, said plates adapted to engage a film disposed therebetween.

3. A film slide comprising, in combination, a pair of opposed complementary channel frame elements each having a channel base which is resilient and substantially tubular in cross section and provided with side walls held resiliently toward each other, a pair of complementary transparent plates having complementary enlargements extending continuously along each longitudinal margin and snugly receivable within the tubular channel base of each frame element holding said frame elements thereupon with the side walls of the frame elements resiliently holding said plates resiliently gripped against a film disposed therebetween.

4. A film slide comprising, in combination, a pair of opposed complementary channel frame elements each having a channel base which is substantially tubular in cross section, a pair of complementary transparent plates having marginal portions received within said channel frame elements, said plates being held together by said frame elements and adapted to engage a film disposed therebetween, end spacer members having substantially tubular marginal portions received within the tubular channel base of each frame element and extending between said frame elements holding them in spaced apart relationship, said plates being provided with corner notches and with gripping apertures at their ends, each end spacer member disposed between said plates and bridging said gripping apertures and having its tubular marginal portions positioned within said corner notches.

5. A film slide comprising, in combination, a pair of opposed complementary transparent plates disposed on opposite sides of a plurality of aligned films of substantially equal width, means yieldingly holding said plates together along one longitudinal margin permitting said plates to be yieldingly swung apart along said margin to insert or remove a film, a channel frame element having a base which is substantially tubular in cross section and having side walls held yieldingly toward each other, said frame element being removably received over the opposite longitudinal margins of said plates with its side walls yieldingly holding said plates together against said films, said opposite longitudinal margins of the plates being shaped to seat within the tubular base of the frame element, and being formed complementally therewith to provide anchorage within said tubular base of the frame element.

CLAUDE E. COX.